United States Patent
Tingle et al.

(10) Patent No.: US 7,126,949 B2
(45) Date of Patent: *Oct. 24, 2006

(54) SOURCE IDENTIFIER FOR MAC ADDRESS LEARNING

(75) Inventors: Nicholas W. Tingle, San Jose, CA (US); Joe Regan, Pleasanton, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/305,515

(22) Filed: Dec. 15, 2005

(65) Prior Publication Data

US 2006/0098654 A1    May 11, 2006

Related U.S. Application Data

(63) Continuation of application No. 10/742,226, filed on Dec. 18, 2003, now Pat. No. 7,006,499.

(60) Provisional application No. 60/466,245, filed on Apr. 28, 2003.

(51) Int. Cl.
*H04L 12/28* (2006.01)
*H04L 12/66* (2006.01)
*H04J 3/16* (2006.01)

(52) U.S. Cl. ............... 370/392; 370/395.5; 370/466; 370/352

(58) Field of Classification Search ............... 370/389, 370/390, 392, 396, 352, 400, 351, 465, 466, 370/467, 395.3, 395.31, 395.5
See application file for complete search history.

(56) References Cited

U.S. PATENT DOCUMENTS

| | | | |
|---|---|---|---|
| 6,674,738 B1 * | 1/2004 | Yildiz et al. | 370/338 |
| 6,741,606 B1 * | 5/2004 | Mori | 370/463 |
| 6,879,600 B1 * | 4/2005 | Jones et al. | 370/466 |
| 6,879,812 B1 * | 4/2005 | Agrawal et al. | 455/67.11 |

* cited by examiner

*Primary Examiner*—Hanh Nguyen
(74) *Attorney, Agent, or Firm*—Van Pelt, Yi & James LLP

(57) ABSTRACT

A header value or label, referred to herein as a source station identification (SSID), is added to an encapsulated packet header, such as by adding the SSID as a label to the bottom of a stack of MPLS labels. The SSID comprises a unique identifier that identifies the PE that originated the packet. In some embodiments, the IP address of the originating PE may be used as the SSID for that PE. The PE receiving this packet can then associate the source Ethernet MAC address of received TLS traffic, e.g., with the originating PE. Given the SSID of the originating PE, the receiving PE is able to determine which LSP to use to send Ethernet traffic to the station with the learned MAC address.

19 Claims, 4 Drawing Sheets

US 7,126,949 B2

SOURCE IDENTIFIER FOR MAC ADDRESS LEARNING

CROSS REFERENCE TO RELATED APPLICATIONS

This application is a continuation of U.S. patent application Ser. No. 10/742,226, entitled SOURCE IDENTIFIER FOR MAC ADDRESS LEARNING filed Dec. 18, 2003 now U.S. Pat. No. 7,006,499 which is incorporated herein by reference for all purposes, which claims priority to U.S. Provisional Application No. 60/466,245, entitled SOURCE IDENTIFIER FOR MAC ADDRESS LEARNING OVER A POINT-TO-MULTIPOINT LABEL SWITCHED PATH filed Apr. 28, 2003 which is incorporated herein by reference for all purposes.

FIELD OF THE INVENTION

The present invention relates generally to data routing and networks. More specifically, a source identifier for MAC address learning over a multipoint-to-point label switched path is disclosed.

BACKGROUND OF THE INVENTION

Organizations and enterprises generate significant revenue by delivering data communication services based on quality of service (QoS), which has become an important metric upon which billing is based. In order to improve or maintain QoS, services such as leased lines, virtual leased lines (VLLs), virtual private networks (VPNs), virtual private LAN services (VPLS), and others provide dedicated data communication systems. These systems provide a "dedicated" path tunnel, which can be a virtual circuit (VC) for data communication between two or more customer networks that are not locally connected.

One typical approach is to define label switched paths (LSPs) through which traffic to a particular destination or set of destinations serviced by a particular provider edge (PE) router may be tunneled. Where multiple locations may need to be able to send traffic to the destination, a multipoint-to-point (sometimes referred to herein by the abbreviation "MP2P") LSP may be defined. In MPLS (multi-protocol label switching), an LSP is typically MP2P. LSPs can also be used for point-to-point (P2P) applications and typically result from the use of label switching and the unidirectional nature of LSPs. In such a MP2P LSP, a plurality of defined paths from the originating PE's associated with ingress tunnel endpoints converge onto a single path entering the destination PE. A problem arises, however, in that the destination PE must have a way of learning the identity of the originating PE and associating that PE with the source MAC address of a received packet, e.g., in order to know how to route traffic sent to that source MAC address. When MPLS or MPLS versions of existing protocols (e.g., RSVP-TE, LDP, MP-BGP, etc.) are used to implement an LSP, the destination (receiving) PE does not have any way of knowing which PE originated the packet, as each node along the LSP uses its own label to forward packets to the next node, with the result that the receiving PE can identify through the primary label only the core device that forwarded the packet to the receiving PE along the last hop or leg of the LSP.

Conventional multipoint-to-point implementations require overlays of virtual tunnels to resolve this problem. In particular, in one typical approach a separate VC label is assigned per source PE for each service. In general, the typical approach solves a source identification problem and the multiplexing of traffic for different VPNs using the same transport. However, it does not reduce the number of labels. This approach is disadvantageous because of the overhead and complexity associated with assigning, managing, and routing packets using such a large number of labels. To quantify the shortcoming, if a separate VC label is assigned for each of "n" PE devices or nodes associated with a particular customer or service, for example, the number of labels per service would be on the order of $n^2$ (specifically $n(n-1)$), as each node would be required to have a separate virtual point-to-point circuit to each other node. By contrast, if the destination PE had a way of identifying the originating PE without requiring that a separate VC label be assigned for each PE for each service, each of the n PE devices would require only one label per service, so that only n labels would be required.

Thus, it would be useful for a solution to solve how to determine a source station's address without creating an additional layer or mesh of tunnels for a MP2P LSP.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Multipoint-to-point routing of data without an overlay or mesh of dedicated path tunnels provides desirable scaling, signaling, and provisioning properties. A header value or label referred to herein as a source station identification (SSID) is added to an encapsulated packet header, such as by adding the SSID as a label to the bottom of a stack of MPLS labels, or as a control worded added between the MPLS header and the VPN data. The SSID comprises a unique identifier that identifies the PE that originated the packet. In some embodiments, the IP address of the originating PE may be used as the SSID for that PE. The IP address may be included as a control word between the MPLS header and the VPN data. The PE receiving this packet can then associate the source Ethernet MAC address of received TLS traffic, e.g., with the originating PE. Given the EP address of the originating PE it is able to determine which LSP to use to send Ethernet traffic to the station with the learned MAC address. Using the techniques below, multipoint-to-point LSPs can be used more effectively for TLS, VPLS, HVPLS (hierarchical virtual private LAN services), and other services. This enables scaling of LSPs to occur as an order of "n" instead of "$n^2$", as in conventional implementation as described above. Signaling protocols such as RSVP and BGP can be used to distribute labels in a simple manner and simplified provisioning occurs because a single destination label is assigned per PE for each service.

Figure 1A:
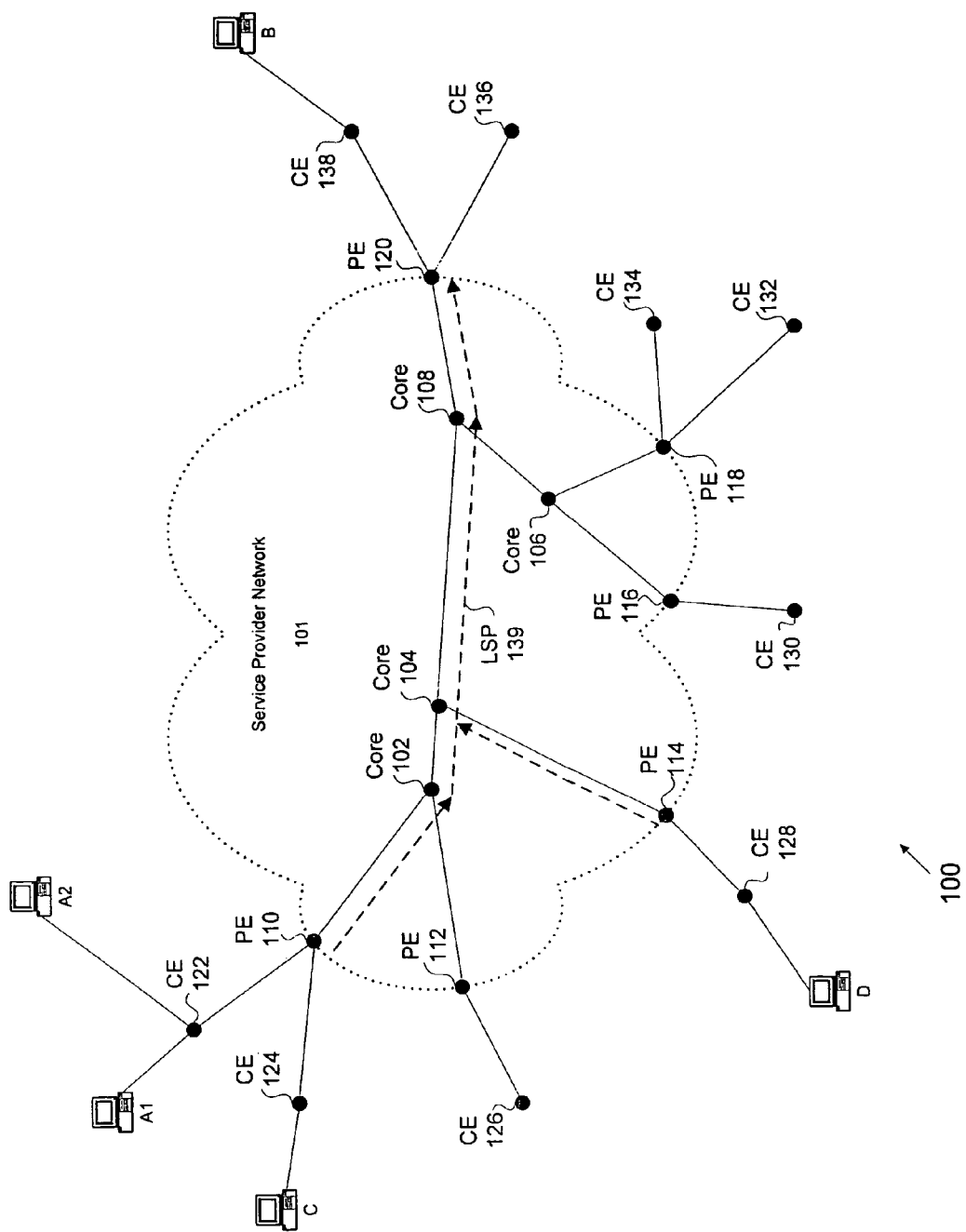
FIG. 1A illustrates a system for learning a MAC address.

FIG. 1A illustrates a system for learning a MAC address. System 100 represents a series of data paths that extend across service provider network 101. Within service provider network 101 are core routers 102–108. Although shown with 4 core routers, in other backbones, fewer or more core routers may be used. At the edges of service provider network 101 are a series of PEs 110–120. PEs 110–120 provide ingress/egress points into/out of service provider network 101 for customer edge (CE) devices 122–138. CEs 122, 124, 128, and 138 are associated with a particular customer and/or service and provide further routing to destinations associated with the customer and/or service. As used herein, the term "router" refers to any equipment used to route data from a source to a destination, and may include any node within a customer or provider network that performs such a routing function. Here, destinations A1, A2, B, C, and D are examples of destinations that route data traffic through CEs 122, 124, 128, and 138. The system is configured, in this example, similar to an "inverted tree" or multipoint-to-point configuration where source stations A1, A2, C, and D are in data communication with destination station B, with traffic from stations A1, A2, C, and D destined for station B being transported over a multipoint-to-point LSP 139, shown in FIG. 1A as a series of arrows in dashed lines originating at PE 110 and PE 114 and terminating at PE 120, through which PEs 110 and 114 are configured to send traffic to PE 120. Similarly, traffic for stations associated with PE 110, e.g., A1, A2, and C, would be sent from stations B or D through a second multipoint-to-point LSP (not shown in FIG. 1A) having PE 114 and PE 120 as ingress points and PE 110 as the destination PE, and traffic for stations associated with PE 114, e.g., D, would be sent from stations A1, A2, B, or C through a third MP2P LSP (not shown in FIG. 1A) having PE 110 and PE 120 as ingress points and PE 114 as the destination PE. In this manner, the locations and network stations associated with CEs 122, 124, 128, and 138 may be linked in a virtual network, such as a virtual private LAN service, using a mesh of MP2P LSPs, whereby customer network traffic, e.g., Ethernet traffic, is transported between locations transparently to the users of the various customer stations. Although only CEs 122, 124, 128, and 138 are shown in data communication with customer networks, in other embodiments, the number of CE routers may be different, depending upon the backbone or network service provider (NSP), number of customers, number of nodes, and other network-influencing factors.

As noted above, one problem that must be addressed when using MP2P LSPs as described herein is the need for a destination PE (i.e., the endpoint of a MP2P LSP) to be able to "learn" the source MAC address of the original sender of a packet received by the PE via the MP2P LSP and associate that MAC address with the ingress PE by which it entered and was sent through the MP2P LSP. In an embodiment, a source station identification (SSID) can be appended to the header of a data packet or frame at the ingress PE, such as by adding the SSID as an additional label at the bottom of an MPLS label stack. Upon receipt by an egress PE, the SSID is used to associate the MAC address for the source station that originated the packet (e.g., the MAC address for CE 122 for a packet sent by station A1, with the ingress PE by which it entered and was sent through the MP2P LSP. With an SSID the number of labels distributed per PE from one-per-VPN-per-peer-PE can be reduced to distributing a label on the basis of one-per-VPN. If an SSID is not the IP address of the PE router, then a separate configuration for mapping an SSID to a PE router may be used.

The MP2P LSP shown in FIG. 1A may be used, e.g., to transport a customer network packet sent from station A1 to station B. Such a packet originated by station A1 would be provided to ingress PE 110 via CE 122. The packet would be encapsulated by PE 110 for transport through the MP2P LSP to PE 120, the encapsulation including a header comprising a VC label associated with the LSP, and would then be routed between core routers 102, 104, and 108, before reaching the edge of service provider network 101 at egress PE 120. PE 120 would then de-encapsulate the packet, reconfigure it as appropriate to the customer network, and send it to CE 138, from which it would be delivered to destination station B. The path used is a LSP tunnel that can be established by signaling the path to the various routers along its length. Various types of signaling protocols may be used and are not limited to those described herein (e.g., BGP, RSVP, etc.). Further, other protocols other than MPLS may be used for establishing tunnel architecture such as that described. Greater detail is provided with regard to the routing of data traffic is provided below in connection with FIG. 1B.

Figure 1B:
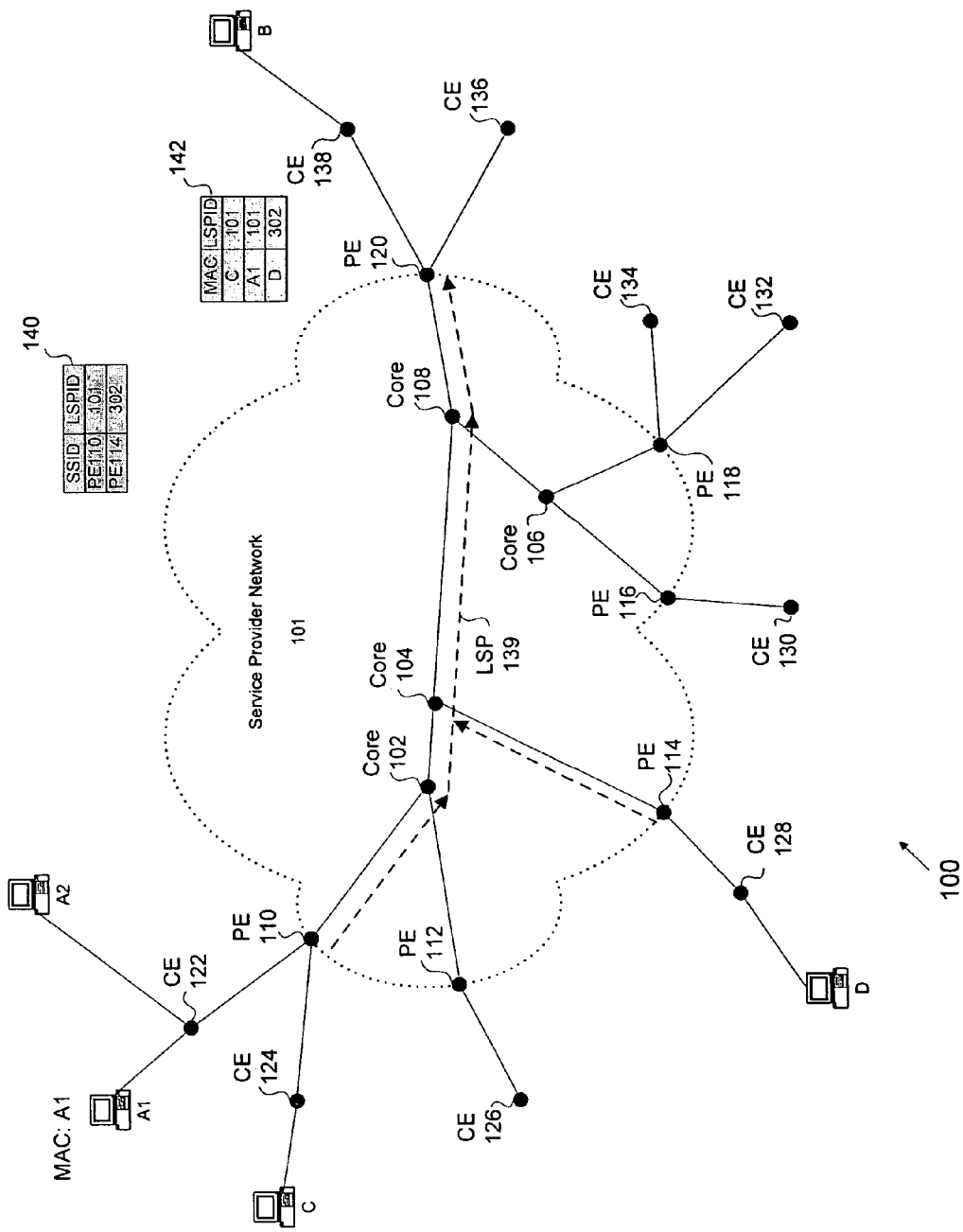
FIG. 1B illustrates a system for learning a MAC address, showing a FIB.

FIG. 1B illustrates a system for learning a MAC address, showing a table 140 used to map SSIDs to an associated LSP identifier (LSP ID) and a FIB 142 used to associated source MAC addresses with a corresponding LSP ID for a particular VPN.

In a MP2P LSP, an LSP ID may be used to identify a dedicated "circuit" or path from two or more ingress PEs located along the edge of service provider network 101 to a destination PE. In the example shown in FIGS. 1A and 1B, an LSP ID may be used to identify the MP2P LSP connecting ingress PEs 110 and 114 with destination PE 120. Similar LSPs, identified by associated LSP IDs, may be established to transport traffic to other PEs participating in a particular service, such an LSP allowing PE 110 and PE 120 to send traffic to PE 114 and an LSP used by PE 114 and PE 120 to send traffic to PE 110. Under one typical approach, each destination PE signals to the other PEs participating in a service, such as a transparent LAN service, a VC label to be used to send traffic associated with the service to that PE. For example, PE 110 may signal to PE 114 and PE 120 that VC Label "101" should be used to send traffic associated with the service to PE 110, and PE 114 may signal to PE 110 and PE 120 that VC Label "302" should be used to send traffic associated with the service to PE 114. The numbers used in this example are completely arbitrary, and any number suitable under the applicable protocols used to establish and provide the LSP may be assigned.

In order to know how to route return traffic, each PE must "learn" an association between the source MAC address in received packets and an LSP ID associated with the ingress PE device that sent the received packet through the MP2P LSP, i.e., each PE must populate a FIB such as FIB 142 of FIG. 1B. In the case of PE 120, for example, initially PE 120 populates table 140 by associating the LSP ID signaled to it for use by each other PE participating in the service with the SSID for that PE. In the example shown in FIG. 1B, the table 140 has been populated with an entry associating the LSP ID "101" with the SSID for PE 110. In table 140, the SSID is listed as "PE110" for convenience and clarity, although as noted above the IP address of the PE may be used as the SSID. When a packet originated by station A1 and directed to station B is received by PE 120, if no entry exists in FIB 142 for the associated source MAC address an entry is created by entering the source MAC address and associating with it the LSP ID associated with the ingress PE from which the packet was received. PE 120 ensures that a received packet is sent to the correct CE. However, in other embodiments, a control word, identifier, or label could be used to identify a CE and thus enable the PE to forward the packet without requiring an additional MAC address lookup. As shown in FIG. 1B, this may be accomplished by reading the SSID (included as an additional label in the stack, e.g., as described above), using table 140 to map the SSID to a corresponding LSP ID, and then associating that LSP ID with the source MAC address in FIB 142. If in the future PE 120 is required to handle outbound traffic destined for the MAC address associated with station A1, PE 120 refers to FIB 142 to obtain the LSP ID to be used to transport the packet to the correct PE (in this case, PE 110).

Figure 2:
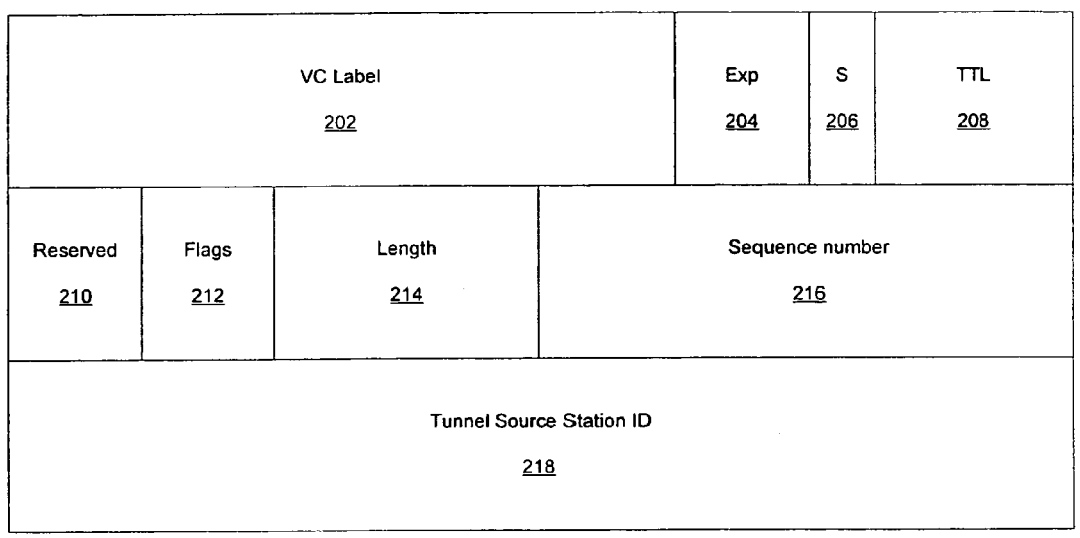
FIG. 2 illustrates an exemplary packet header including a source identifier for learning a MAC address.

FIG. 2 illustrates an exemplary packet header including a source identifier for learning a MAC address. Several fields are included in packet header 200, which represents the encapsulated data that is used to route a packet or frame between a source and destination station. VC label 202 indicates the virtual circuit path tunnel that the particular data packet is intended to follow. Specific path tunnels are provided between particular endpoints, which are assigned based upon a specific QoS. EXP bits 204 are part of the MPLS header, providing for an experimental value. If the encapsulated frame is an Ethernet frame that contains an IEEE 802.1q VLAN tag, the p-bits of the tag may be mapped to the EXP bits at the ingress tunnel endpoint. The EXP bits may be mapped back into p-bits of a VLAN tag at the egress tunnel endpoint. S bit 206 denotes the bottom of the label stack. TTL value 208 provides a time-to-live value of the VC label. VC label 202, EXP bits 204, and TTL value 208 are, in this embodiment, standard components of the MPLS header. A reserved field 210 is provided for additional header information. Flags 212 provide a field for other labels and identifiers that can be used to identify resources or portions of a particular path along which data may be routed. Length 214 may be used to define the length of certain specific fields within the encapsulated header packet. Sequence number 216 determines the order for the data packet or frame in order to guide reassembly upon arrival at a destination station. Reserved field 210, flags 212, length 214, and sequence number 216 are collectively identified as control words for use with MPLS implementations. Finally, an additional control word is contained in SSID 218. SSID 218 is included, providing a control word that can be associated with an originating source station (e.g., the originating PE) for the purpose of enabling egress tunnel endpoint to "learn" MAC address origins and associate them with transport tunnels for outbound traffic associated with such learned MAC addresses. Preferably, an SSID is a 4-byte field providing an identifier associated with a source station. However, in other embodiments, the field length may be larger or smaller. By learning the particular source address, edge routers such as PEs 110–120 are able to determine where a particular packet has come from and where response packets should be directed.

Figure 3:
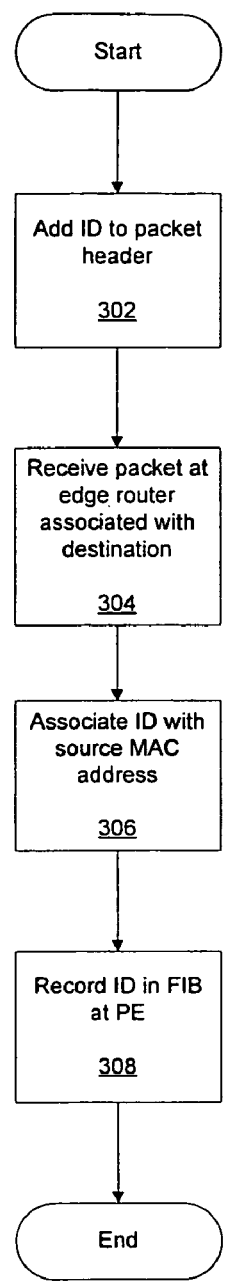
FIG. 3 illustrates a process for associating an identifier with a source MAC address.

FIG. 3 illustrates a process for associating a source station identifier with a source MAC address. An identifier is added to a packet and transmitted along a path tunnel, such as an LSP or VC (302). The identifier may be added by an ingress endpoint of the LSP or VC, such as by an ingress PE device. The identifier may be any value or string that is unique to the ingress PE, such as the IP address of the PE. Once transmitted, the packet is received at a destination edge router (e.g., PE) (304), which associates the identifier with a source station address (e.g., MAC address) (306). By associating a MAC address with the identifier, an edge router learns how to route data traffic back to an originating point associated with the MAC address, without there having to be established an actual or virtual point-to-point circuit or path for each possible originating endpoint, as described above. After associating the MAC address with the identifier, the identifier is recorded in a FIB at the particular edge router (e.g., PE, CE) (308). Other PEs on service provider network 101 (FIGS. 1A, 1B) that receive the packet, e.g., in the case of a packet broadcast to all other PEs associated with a service, may likewise "learn" the association of the source MAC address with the identifier (e.g., SSID). In other embodiments, other databases, management information bases (MIBs), or other repositories associated with the provider edge routers (or devices) may be used to store the identifier(s).

In conventional implementations, the inability of MPLS-implementations to identify a source station for a received packet an egress router is solved. Further, signaling protocols are also affected in that fewer path tunnels need to be signaled for setup and reservation when using an SSID. The use of an SSID also enables services such as a transparent bridge, switch, or other TLS to be implemented more efficiently by providing a mechanism for learning the source station's MAC address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for routing data between an originating station that is different from a node that originally sent the data and a destination station using a protocol under which the identity of the originating station may not be apparent to the destination station, the data comprising a source address associated with the node that originally sent the data, comprising:

receiving the data at the destination station;

extracting from a header associated with the data a source station identifier associated with the originating station and included in the header by the originating station; and associating the source station identifier with the source address;

wherein the format and required content of the header is prescribed by the protocol and the source station identifier is included in the header in a manner that does not interfere with the format and required content of the header required for the normal processing of the header under the protocol.

2. A method for routing data as recited in claim 1 wherein under the protocol the data is sent from the originating station to the destination station through a multipoint to point label switched path.

3. A method for routing data as recited in claim 1 wherein the protocol comprises the multiple protocol label switching (MPLS) protocol.

4. A method for routing data as recited in claim 1 wherein the source station identifier is associated with a path to the originating station.

5. A method for routing data as recited in claim 1 wherein the source address comprises a MAC address associated with the node that originally sent the data.

6. A method for routing data as recited in claim 1 further including sending a response packet to the node that originally sent the data via the originating station along a path associated with the source station identifier.

7. A method for routing data as recited in claim 6 wherein the path comprises a label switched path to the originating station.

8. A method for routing data as recited in claim 1 wherein associating the source station identifier with the source address comprises associating with the source address a path identifier associated with a path to the originating station.

9. A method for routing data between a source station and a destination station as recited in claim 1 further comprising forwarding the data from the destination station to an intended recipient node indicated in the data.

10. A method for routing data between a source station and a destination station as recited in claim 1 wherein associating the source station identifier with the source address comprises identifying an ingress tunnel endpoint.

11. A method for routing data as recited in claim 1 wherein the destination station comprises an edge router associated with a service provider network.

12. A method for routing data as recited in claim 1 wherein associating the source station identifier with the source address includes storing data associated with the source station identifier in a forwarding information base.

13. A system for routing data between an originating station that is different from a node that originally sent the data and a destination station using a protocol under which the identity of the originating station may not be apparent to the destination station, the data comprising a source address associated with the node that originally sent the data, comprising:

a processor configured to extract from a header associated with the data a source station identifier associated with the originating station and included in the header by the originating station and associate the source station identifier with the source address; and a memory configured to store the source station identifier and the source address;

wherein the format and required content of the header is prescribed by the protocol and the source station identifier is included in the header in a manner that does not interfere with the format and required content of the header required for the normal processing of the header under the protocol.

14. A system for routing data as recited in claim 13 wherein the data comprises an Ethernet frame.

15. A system for routing data as recited in claim 13 wherein the packet header is based on multiprotocol label switching.

16. A system for routing data as recited in claim 13 wherein the processor is associated with the destination station.

17. A system for routing data as recited in claim 13 wherein the processor is associated the destination station and the destination station comprises a provider edge router.

18. A system for routing data as recited in claim 13 wherein the source station identifier is associated with a path that may be used to send data from the destination station to the originating station.

19. A computer program product for routing data between an originating station that is different from a node that originally sent the data and a destination station using a protocol under which the identity of the originating station may not be apparent to the destination station, the data comprising a source address associated with the node that originally sent the data, the computer program product being embodied in a computer readable medium and comprising computer instructions for:

receiving the data at the destination station;

extracting from a header associated with the data a source station identifier associated with the originating station and included in the header by the originating station; and associating the source station identifier with the source address;

wherein the format and required content of the header is prescribed by the protocol and the source station identifier is included in the header in a manner that does not interfere with the format and required content of the header required for the normal processing of the header under the protocol.

* * * * *